United States Patent [19]

Soref

[11] 4,116,544

[45] * Sep. 26, 1978

[54] LIQUID CRYSTAL REFLECTIVE DISPLAY APPARATUS

[75] Inventor: Richard A. Soref, Chestnut Hill, Mass.

[73] Assignee: Beckman Instruments, Inc., Fullerton, California 92634

[*] Notice: The portion of the term of this patent subsequent to Apr. 30, 1991, has been disclaimed.

[21] Appl. No.: 785,009

[22] Filed: Apr. 6, 1977

Related U.S. Application Data

[63] Continuation of Ser. No. 331,437, Feb. 12, 1973, abandoned.

[51] Int. Cl.² ............................................. G02F 1/13
[52] U.S. Cl. ................... 350/336; 350/337; 350/338; 350/344; 350/347
[58] Field of Search ................ 350/150, 160 LC, 336, 350/337, 338, 344, 347; 58/50 R

[56] References Cited

U.S. PATENT DOCUMENTS

| | | | |
|---|---|---|---|
| 3,612,654 | 10/1971 | Klein et al. | 350/160 LC |
| 3,625,591 | 12/1971 | Freiser et al. | 350/150 |
| 3,674,342 | 7/1972 | Castellano et al. | 350/160 LC |
| 3,701,249 | 10/1972 | Bergey et al. | 350/160 LC X |
| 3,756,694 | 9/1973 | Soref et al. | 350/160 LC |
| 3,771,855 | 11/1973 | Burns | 350/160 LC |
| 3,807,831 | 4/1974 | Soref | 350/150 |
| 3,881,809 | 5/1975 | Fergason et al. | 350/160 LC |
| 3,973,388 | 10/1976 | Yoshida et al. | 358/160 LC X |

*Primary Examiner*—Edward S. Bauer
*Attorney, Agent, or Firm*—R. J. Steinmeyer; F. L. Mehlhoff; W. H. May

[57] ABSTRACT

A flat screen, electrically controlled, reflective display device is provided that utilizes a very thin layer of a positive dielectric anisotropy liquid crystalline material of the nematic type. The selected liquid crystal material is one whose optical phase shift transmission is a sensitive function of the electric field within it, allowing controlled optical transmission in conjunction with an optical circular polarizer. The nematic material is placed in a very thin layer in a flat-sided cell between transparent planar cell wall elements that accurately define the thickness of the nematic layer. Birefringence of the nematic liquid crystal is controlled by voltages applied to interleave arrays of alternate parallel electrodes coated on the inner surface of only one of the transparent cell elements. The invention includes novel means for holding constant and uniform the thickness of the thin nematic layer and for reducing undesired parallax and multiple image effects.

4 Claims, 6 Drawing Figures

LIQUID CRYSTAL REFLECTIVE DISPLAY APPARATUS

This is a continuation, of application Ser. No. 331,437, filed Feb. 12, 1973 and now abandoned.

BACKGROUND OF THE INVENTION

1. Field of the Invention

The invention relates to electrically controllable panel display devices employing positive dielectric anisotropy liquid crystalline materials as electrically active media and more particularly relates to such display devices in which the size, shape, and location of two-dimensional display patterns can be changed in discrete steps.

2. Description of the Prior Art

Nematic liquid crystal materials offer utility in electric current controlled display devices of the flat panel type. One prior art application of such electrically controllable dynamic scattering materials employs a structure which is a cell generally of sandwich configuration comprising first and second sets of transparent planar electrode systems and a specularly reflective mirror spaced from the second electrode system. Between the two electrode systems is located a relatively thick layer of active nematic material. With no electric field applied between the two electrode sets, the liquid crystal material is optically transparent. Thus, if the mirror reflects a black background, the cell looks black to a viewer looking into it through its transparent first electrode system. When an electric field is applied between the two spaced electrode systems, the liquid demonstrates turbulence and abruptly loses its transparent characteristic, scattering any light flowing into it through its transparent first electrode system. In this state, the scattered light is returned to the viewer, and the apparent color of the cell generally has the same spectral content as the light passing into it through the first electrode system. When the electric field is removed, the material abruptly reverts to its transparent state and looks black to the observer.

Such prior art displays have made advantageous use of the properties of liquid crystal compositions. However, the displays require electrode systems on interior surfaces of both the first and the second wall elements of the cell, which electrode systems accordingly require careful alignment during assembly and the displays are therefore expensive to produce. Such prior art devices, having conducting electrodes on each side of the nematic layer, are also subject to accidental short circuiting between electrode systems. A factor further degrading the life of the prior art displays is that the primary phenomenon producing the display is induced by electric current flow, rather than by effects directly responsive to the electric control field. Such substantial current flow tends to cause the liquid crystal materials to deteriorate, reducing the life span of the display. Relatively high operating power is also required. Prior art displays of this type do not permit wide angle viewing and suffer from parallax problems and from unwanted specular reflections in the reflective mode.

SUMMARY OF THE INVENTION

The invention is an electric-field controlled, electro-optical display device of the panel type which includes a very thin layer of positive dielectric anisotropy nematic liquid crystalline material directly responsive to electric fields imposed within that nematic material and therefore overcoming defects present in the prior art. The invention is an improvement over the basic concept of the R. A. Soref U.S. Pat. No. 3,807,831 for Liquid Crystal Display Apparatus issued Apr. 30, 1974 and assigned to Beckman Instruments, Inc.. As in the prior Soref patent, the nematic material is placed within a thin cell having transparent frontal and rear cell wall elements which have precisely parallel flat sides. The electric control field threading the nematic layer is provided by an array of electrodes placed only on one inner surface of one of the cell-defining wall elements. Birefringence of the nematic liquid crystal is controlled by selected voltages applied to interleaved or interdigital electrode sets which constitute a pair of coplanar cooperating electrode systems, the pair being formed on the inner surface of the one cell surface. Alignment of the elements of the electrode sets may thus be accomplished automatically in one photographic step, manufacture and assembly of the device being significantly simplified. Since electric control fields effects are directly employed, operating power is reduced and the life expectancy of the display cell is increased. Uniformity of construction and long useful life are assured by forming mesas on one of the cell walls or plates, which mesas precisely define the thickness of the nematic layer. The mesa construction permits the use of economical manufacturing methods and permanently defines the width of the active nematic layer, confining it uniformly to a selected value as small as 0.5. microns. Wide angle viewing is attained, as well as relative freedom from parallax effects and from stray specular reflections.

DESCRIPTION OF THE PREFERRED EMBODIMENTS

Figure 1:
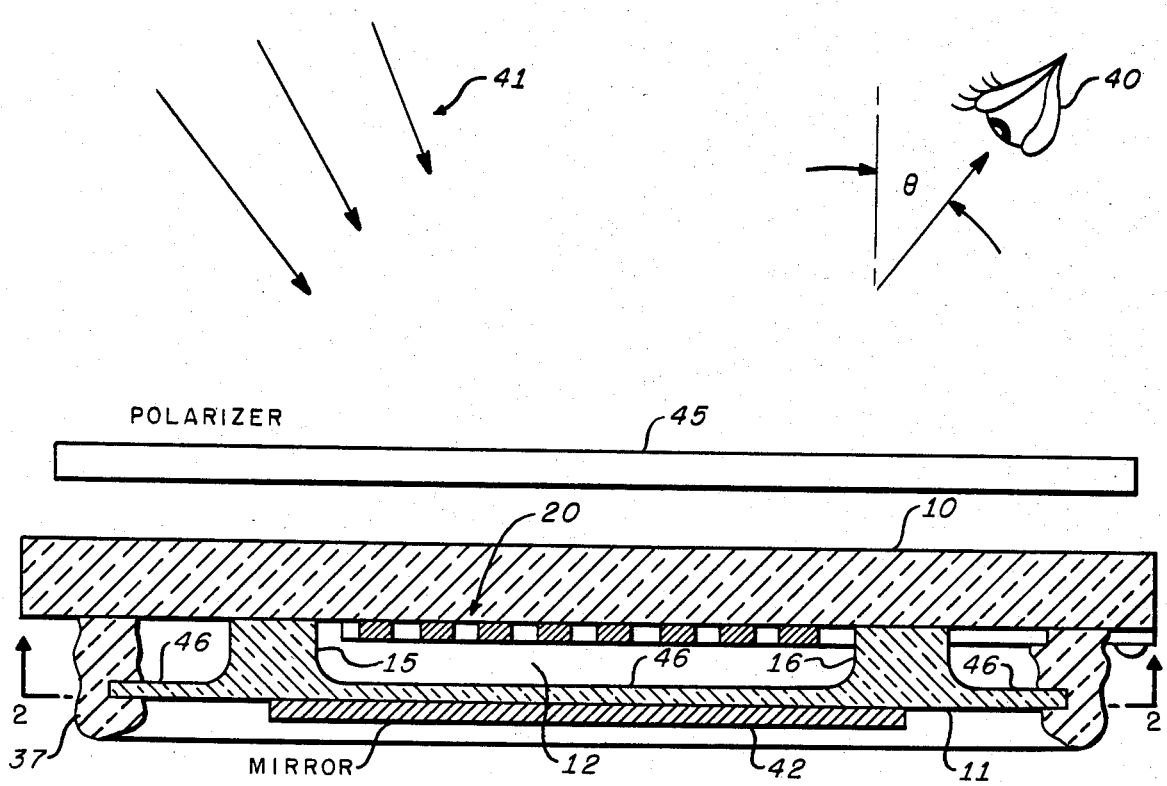
FIG. 1 is an elevation cross section view of one form of the invention.
Figure 2:
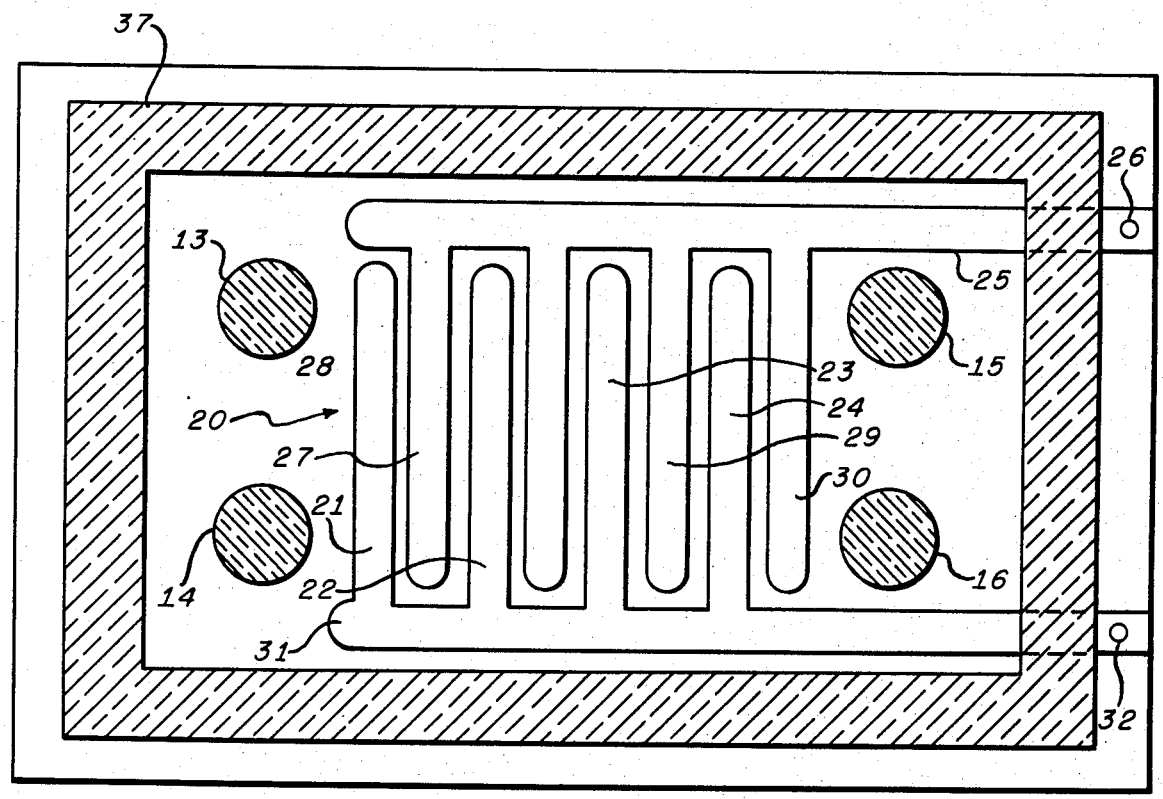
FIG. 2 is cross section of the FIG. 1 structure taken along the line 2—2.

Referring now to FIGS. 1 and 2, the improved construction of the novel electrically-controlled birefringent display is shown as utilizing a pair of parallel-sided flat glass or optically transparent dielectric plates 10 and 11, plate 11 being specially shaped in order to accommodate a very thin layer of electric field sensitive liquid crystal material particularly within interior region 12, as will be explained. Plate 11 is spaced from plate 10 by a plurality of mesa spacers such as spacers 13, 14, 15, and 16 formed integrally with the inner surface of plate 11. Mesa spacers 13, 14, 15, 16 are placed conveniently on the inner surface of plate 11 so as not to interfere with the location of the active interdigital electrode system 20 coated on only one or the other of the interior surfaces of the respective plates 10, 11.

It will be understood that the proportions used in FIG. 1 are particularly distorted so as to make the figure readily understandable. For example, the electrode system 20 yet to be described must be extremely thin, for example, about 400 Angstroms thick, as it is to be optically transparent. The thickness of the region 12 between plates 10 and 11 is so small as to provide capillary action and other important results, as will be further described.

Electrode system 20 comprises the parallel-disposed conductive and optically transparent electrode elements 21, 22 23, and 24 coupled to an elongate terminal conductor 31 having an exterior terminal 32. Electrode system 20 also includes the parallel-arranged conductive and optically transparent electrode elements 27, 28, 29, and 30 coupled to an elongate terminal conductor 25 having an external electrical terminal 26. The electrodes 24, 30, for example, may be spaced apart about 12 microns and be 10 to 15 microns wide. The respective electrodes 21, 22, 23, and 24 are arranged in parallel interdigital fashion with respect to electrodes 27, 28, 29, and 30, as seen particularly in FIG. 2. By virtue of their relatively low resistance, terminals 26 and 32 and the associated electrodes are substantially equipotential surfaces. Terminals 26, 32 may be coupled across a series connected switch and voltage source which latter may be a direct or alternating voltage source, as preferred.

It is seen that any adjacent pair of electrodes, such as electrode 21 and 27, are adapted in themselves to form an electric field lying between them. Dielectric plates 10 and 11 may be constructed from any suitable glass or generally from a transparent insulating material compatible with the optical and hermetic sealing requirements of the cell system. For example, the material may be selected to have an optical index of refraction similar to that of the electric field sensitive or nematic material to be placed in region 12 so as to avoid undesired reflections at optical interfaces. So that the active material may be preserved in its pure form, protected from contaminants and having uniform thickness, a quadrilateral dielectric wall 37 is formed as a continuous enclosure wall at the four edges of plates 10 and 11.

Referring especially to FIG. 2, it will be seen that particular arrays of electrodes such as array electrodes 21, 22, 23, 24, and array electrodes 27, 28, 29, 30 are shown; it will be understood that the figures are drawn in such proportions particularly for illustrating the basic principles of the invention with clarity. In actual practice, an array of very many thin and closely spaced electrodes such as electrodes 21, 22, 23, 24 will be used, with closely spaced interdigitally located electrodes such as electrodes 27, 28, 29, 30. Electrodes 21, 22, 23, 24 may be instantaneously negative, for instance, while electrodes 27, 28, 29, 30 may be instantaneously positive. In such a case, instantaneous electric fields are set up between the several alternate electrodes. As in FIG. 3, an electric field of one sense is found in the region between the oppositely poled electrodes 28 and 23, while an electric field of a reversed sense is found between electrodes 23 and 29, and so on throughout the interleaved array of electrodes. The electric fields lie primarily parallel to plates 10, 11, although the fields also fringe somewhat in other directions.

The effect of the electric field applied through terminals 26, 32 is observed in a preferred form of the invention by direct viewing, with the eye as at 40 in FIG. 1, the diffused ambient light represented by rays 41 that pass through circular polarizer 45 and through plate 10, the liquid crystal material in region 12, and the plate 11 thereupon to be reflected by a diffuse mirror 42 affixed to the exterior surface of plate 11. The reflected light retraverses the region 12, plate 10, and circular polarizer 45 to reach the eye at 40. Operation of the invention is generally as explained in the aforementioned Soref U.S. Pat. No. 3,807,831.

In the preferred form of the invention, construction of the high resolution interdigital electrode system 20 is accomplished in the manner described in the R. A. Carey, Sr., R. A. Soref patent application Ser. No. 331,436 filed Feb. 12, 1973, now abandoned assigned to the Sperry Rand Corporation and entitled: "Liquid Crystal Display Apparatus." In general, the soft glass plate 10 may be purchased with a thin, optically transparent conductive indium oxide or similar transparent film on one surface. The oxide film may be of such thickness that its electrical resistivity is about 200 to 500 ohms per square. Before masking of the indium oxide film and etching it to form the electrode system 20 therein, the oxide coated surface of plate 10 is subjected to a series of cleaning steps as described in patent application Ser. No. 331,436, now abandoned. When clean, the oxide coated surface of the plate is coated with photoresist, and a photomask for providing the pattern of the electrode system 20 is placed over the photoresist material, which then is exposed to actinic ultraviolet radiation flowing through the mask. The plate 10 is immersed in a developer solution in the conventional manner, is dried after removal, and is baked at substantially 150° Centigrade for 90 minutes in a flowing inert gas.

After cooling, the plate 10 is then immersed in a 50 percent hydrochloric acid, 50 percent water solution at 65° Centigrade for approximately 25 seconds for etching away the exposed and undesired indium oxide material. The developed photoresist is removed by a conventional photoresist stripper. Additional cleaning steps may then be taken to ensure perfect cleaning as further discussed in the aforementioned patent application Ser. No. 331,436. The cleanliness of the plate 10 is safeguarded by placing it in an appropriate container awaiting its assembly with other parts of the display device of FIG. 1. Rubbing of the plate is strictly avoided.

The companion plate 11 is constructed in a manner overcoming the defects of prior art methods for providing proper spacing between plates 10 and 11 and for permitting a mirror to be placed on its outer surface in very close proximity to the thin active liquid crystal layer. The spacing employed between the inner surfaces of plates 10 and 11 according to the present invention is required to be 0.5 to 2.5 microns, but may preferably lie within the range 1.4 to 1.9 microns. Such spacings are much smaller than customarily employed in displays depending upon other effects such as turbulence effects in the electrooptical medium, and the previously used glass shims and polymer spacers are not acceptable. Further, they have been found to be difficult to use in economical production and tend to shorten the useful life of the nematic material.

A plate 11 of a soft glass similar in material and shape to plate 10 is selected and may be subjected to certain cleaning steps such as those described in connection with plate 10, for example. A photoresist layer formed in a generally similar manner as described in the foregoing is coated over one surface of plate 11 and is then exposed to actinic radiation through a conventionally formed mask having a pattern of circular, square, or otherwise shaped mask openings corresponding to the intended locations and shapes of the desired mesa spacers 13, 14, 15, 16 of FIGS. 1 and 2. Spacers such as spacers 13, 14, 15, 16 are generally located so that they do not conflict with the desired locations of elements of the electrode system 20. The spacers are also separated sufficiently to allow the liquid crystal material readily to flow into the display, as will be described. The developed photoresist patterns corresponding to mesas 13, 14, 15, 16 protect the glass beneath them from etching when the plate 11 is next placed in a 50 percent hydrofluoric, 50 percent de-ionized water solution at room temperature for a period of substantially six seconds where a 1.0 micron etch depth is desired for producing a 1.0 micron thick region 12 for the active medium layer. When the etchant immersion period ends, plate 11 is immediately flushed with running luke warm water, stopping the etching process. Removal of photoresist material and final cleaning may be accomplished as in the foregoing, for example. The plate 11 then takes the form shown in FIGS. 1 and 2, leaving flat-topped, smooth sided mesas 13, 14, 15, 16 projecting very slightly from a smooth, flat surface 46. The new surface 46 of the glass plate 11 is found to be optically good and without noticeable defects. Accordingly, if desired, the electrode system 20 may be placed on surface 46 rather than on plate 10. It should again be noted that proportions in FIG. 1 are distorted for clarity; for example, the height of mesas 13, 14, 15, 16 is considerably exaggerated. It should further be noted that the active surfaces of plates 10 and 11, though treated to be very clean, are never rubbed as in the case of ordinary liquid crystal displays. Rubbing of the plate prevents the display from operating in its novel homeotropic mode with the nematic molecules lying in their initial condition perpendicular to plates 10, 11.

Having completed formation of plates 10 and 11, they are assembled in such a manner as to form a permanently sealed container for the active liquid crystal material. For this purpose, the plates 10 and 11 are first aligned as in FIGS. 1 and 2 so that the mesa spacers 13, 14, 15, 16 do not overlap the electrode system 20 and so that the plates 10, 11 are held clamped together by a suitable tool. Conventional battery clips are readily adaptable for the purpose. A thick paste of a glass frit using a suitable commercially available fluid vehicle such as a mixture of amyl acetate and nitrocellulose is prepared. The paste is applied at the perimeter of the structure or at the edges of plates 10 and 11 to form the wall 37 of FIG. 1. Edge-seal wall 37 is provided with vent openings (not shown) and a filling slot (not shown) which are left open. The assembly is then heated at substantially 120° Centigrade in a gently flowing inert gas such as argon for about 15 minutes. This heating drives off water vapor and any volatile solvents from the frit and the frit hardens to the extent that the battery clips may be removed. A small weight is placed upon the assembly and the assembly is heated in a conventional frit oven in air to about 450° Centigrade, that temperature being held for substantially one hour so that the frit is fused and sintered together to form the non-porous wall 37 bonded to plates 10 and 11. In addition to fusing the frit, the 450° Centigrade temperature serves to bake out plates 10 and 11, thereby removing any contaminating surface layer from the plates.

The electrical power to the frit oven is removed, permitting the oven to cool in about two hours to a temperature somewhat above the temperature at which the liquid crystal material to be used transfers to its isotropic phase (such as above 130° Centigrade, for example). As soon as the assembly temperature reaches such a temperature, a large drop of filtered liquid crystal material is placed at the filling slot so that it is drawn into the thin capillary interior region 12 between plates 10 and 11. As in the case of the high temperature bake out, the temperature of the assembly during the filling event is selected so as to be high enough to minimize adsorption of water vapor on the interior surfaces of region 12 and hot enough to hold the liquid crystal material in melted condition. It evidently must not be so hot as to damage the liquid crystal material itself. The liquid crystal material is allowed to flow for 15 to 30 minutes between plates 10, 11 until its motion ceases when region 12 is filled or approximately filled. One purpose of the fusing and bake-out cycle and of the high temperature filling cycle is to provide a clean inner surface for glass plate 11 and a clean indium-oxide surface for plate 10, neither of which has an adsorbed surface layer. The surface energy of the clean plates is then such that many nematic liquids tend to align spontaneously with their long axes perpendicular to the glass plate surfaces. It will be apparent that the method of obtaining homeotropy described herein may be adopted as a matter of convenience, as an equally useful method to attain homeotropy in the interdigital display is to coat both glass plates 10 and 11 with a thin film of surfactant material or, more simply, to dissolve a small percentage of a conventional surfactant in the liquid crystal material itself prior to filling the cell.

The vents and filling slots through which air escaped are next sealed. This sealing may be accomplished by sealing the slots with a conventional epoxy cement which normally hardens in about 2 minutes. Alternatively, the vent and filling slots may be sealed rapidly by melting the frit material together with a conventional laser beam welding tool.

The novel mirror 42 is now to be integrated with the aforedescribed structure. Since the light rays 41 seen in FIG. 1 may approach the electro-optical device from a variety of angles, a corresponding multiplicity of imaging or parallax effects might ordinarily be viewed by the eye at 40. Since the light rays 41 pass through region 12 twice, these images appear to emanate from locations when the rays strike mirror 42, rather than from the plane of intersection with the liquid crystal layer. Parallax is minimized by locating the reflecting plane of mirror 42 as close as possible to the liquid crystal layer. For this purpose, the wall of plate 11 is made very thin between 2 and 5 mils in thickness, consistent with maintaining proper mechanical strength. The beneficial process used in generating the plate 11 with its integral mesas 15, 16 readily makes it possible to construct mirror 42 directly on a thin wall and very close to the active liquid crystal medium, as seen in FIG. 1.

In the preferred way of constructing the mirror 42, a commercially available aluminum, silver, or gold powder paint is brushed or sprayed on the smooth outer surface of plate 11. A paste of silver epoxy material may alternatively be used, as well as other suspensions which provide randomly located reflective metal flake-like particles suspended in a conventional transparent binder for causing diffuse reflection and consequently for permitting wide angle viewing of the display with substantially no multiple imaging. Reflectivity in the displaying state of such diffuse metal particles or platelets is excellent; in the homeo-tropic or non-displaying state, the display face is very dark, either very dark purple or dark blue, over a range of viewing angles of ± 30° from the vertical. The outer surface of the plate 11 may be roughened by grinding or sand-blasting before painting, or such a roughened surface may be coated chemically or in a vacuum metal deposition apparatus, for example, with aluminum or silver. The diameters of the irregular hills and valleys formed at the surface may be from 1 to 10 microns, for example, The diffuse mirror is preferably located less than 5 mils from the active liquid crystal layer so as to minimize parallax effects and the separation is maintained uniform over the display area because of the good mechanical properties of the mesa construction.

The electrode assembly 20 may take on any of a variety of forms, such as the simple interdigital form shown in FIGS. 1 and 2, as well as other more complex forms. For example, the interdigital electrode conformation may be employed to construct seven-segment numeric displays such as those of the aforementioned R. A. Soref U.S. Pat. No. 3,807,831. Other configurations will readily be conceived by those skilled in the art.

Figure 3:
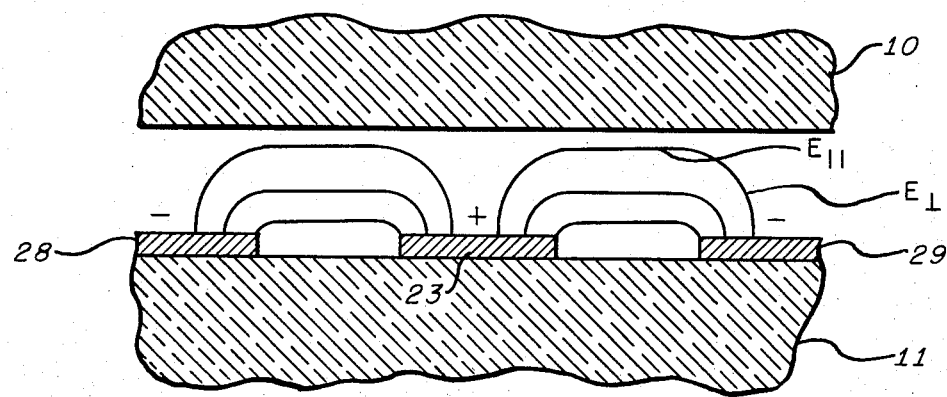
FIG. 3 is an enlarged cross section view of a portion of FIG. 1 for illustrating electric field configurations employed in the invention.

As was observed with reference to FIG. 3, the electric field lines $E_{\parallel}$ between adjacent electrodes such as electrodes 28 and 23 are largely parallel to plates 10 and 11, the fringing field $E_{\perp}$ components having only a small effect upon the liquid crystal medium. According to the invention, liquid crystal materials from those known to display strong positive dielectric anisotropy are selected particularly for use in the present situation, since positive anisotropy materials (initially homeotropic) are most sensitive to the $E_{\parallel}$ transverse electric field components. The thin homeotropic nematic layer in which electrically controllable birefringence effects are to be viewed may be selected from well known liquid crystal materials, including a known mixture of nematic liquid crystals having strong positive dielectric anisotropy, operating at relatively low drive voltages at room temperature, and composed of equal molar proportions of nitrile Schiff bases. Such a mixture demonstrates desirably low electrical conductivity and also has a desirably large dielectric anisotropy ($\epsilon_{\parallel} = 25$, while $\epsilon_{\perp} = 8$). Suitable nematic materials are discussed in the aforementioned patent application Ser. No. 331,436, now abandoned, and elsewhere.

Figure 4:
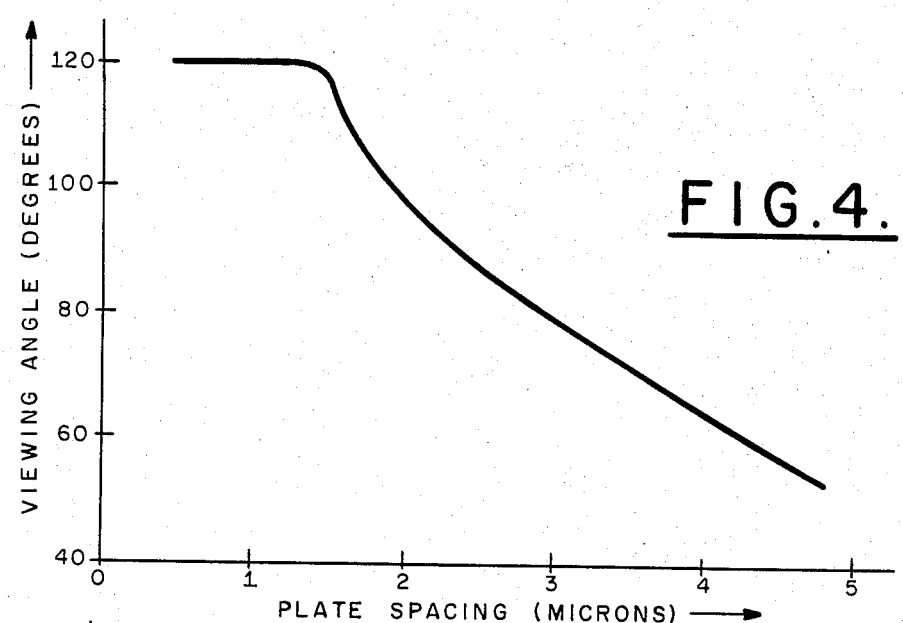
FIGS. 4, 5, and 6 are graphs useful in explaining the operation of the invention.

The performance of the invention is of particular interest in explaining the choice of very small separations for the inner surfaces of plates 10 and 11 and the location of mirror 42. FIG. 4, for example, is a graph of the maximum viewing angle (twice $\theta$ of FIG. 1) with respect to the vertical as a function of the internal separation $d$ between plates 10 and 11, the distance between electrodes and electrode widths being held constant. The curve is a locus for points where the on-off contrast is 11 to one or more. It is seen that a total viewing angle of 120° is constantly available for values of $d$ lying substantially between 0.5 and 1.5 microns. It is seen that the optimum values for $d$ cover a small range and that the benefit of mesas 13, 14, 15, 16 of FIG. 2 is to maintain uniformity in the value of $d$ for the life time of the product.

Figure 5:
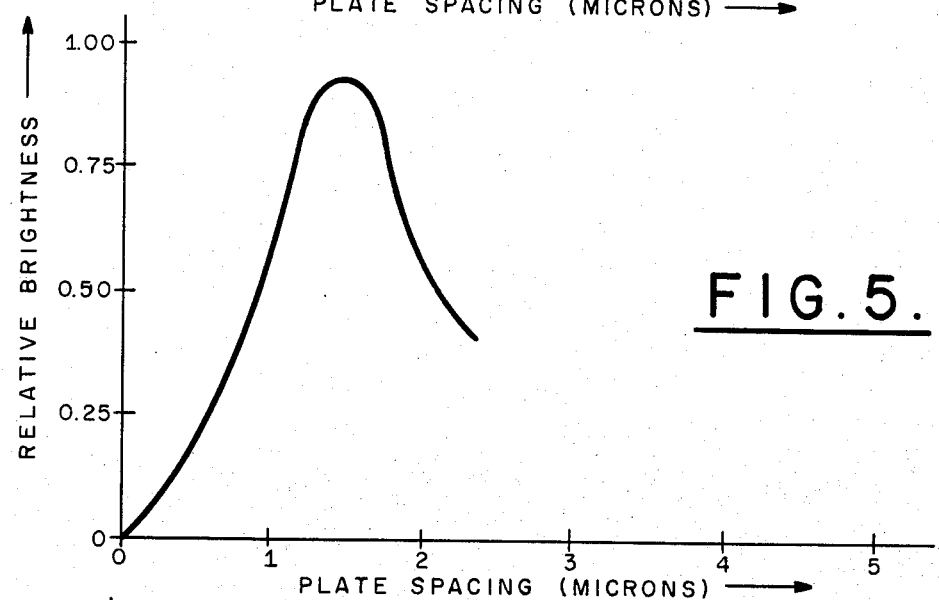
Figure 6:
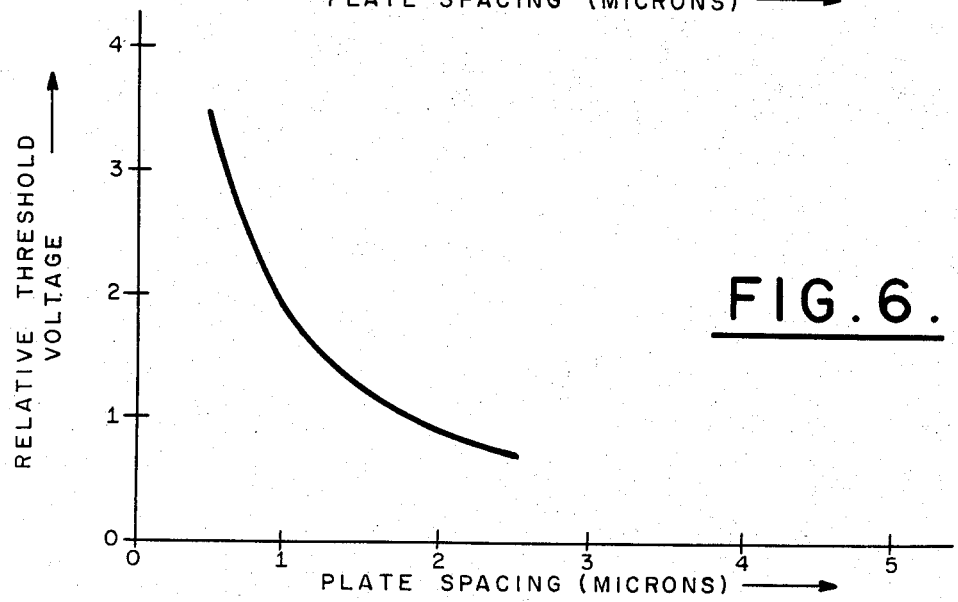

FIG. 5 illustrates the relation between plate separation $d$ and the brightness of the display in its fully on state. The peak of this curve falls at approximately 1.4 microns for $d$. The r.m.s. driving voltage for the curve in FIG. 5 is about three times the threshold voltage for the material. FIG. 6, which plots threshold voltage in arbitrary units against the separation $d$ shows that the normalized threshold voltage lies in an intermediate and acceptably low range for plate spacings between 1.2 and 2.0 microns. More specifically, the observed threshold voltage conforms to the relation:

$$V_t = \frac{\pi S}{d} \sqrt{\frac{K_{33}}{\epsilon_0 (\epsilon_{\parallel} - \epsilon_{\perp})}}$$

where S is the uniform electrode finger separation, and $K_{33}$ is the elastic bend constant of the nematic. The three graphs indicate that a value of $d$ of 1.5 microns is generally optimum. However, if plates 10 and 11 should be squeezed together, unsuitable values of relative brightness and of high threshold voltages are rapidly demonstrated in at least parts of the display, further illustrating the benefit of the novel structure whereby the glass mesas 13, 14, 15, 16 maintain $d$ constant and uniform at a value selected between 0.5 and 2.5 microns or preferably at a value selected between 1.4 and 1.9 microns. For long-term reliability or long life, it is found that the frequency of the alternating voltage should be greater than $f_c$, where $f_c$ is defined in the conventional manner as the space charge relaxation frequency and is equal to $\sigma/2\pi \epsilon_{\perp} \epsilon_0$, $\sigma$ — representing the electrical conductivity of the liquid crystal. The quantity $f_c$ is typically about 100 Hz.

It is seen that the invention is a liquid crystal electrooptic display device or light valve of the reflective type in the form of a flat panel display or modulator that employs an interdigital electrode structure. The interdigital dielectric electrode array is required only at one surface of the very thin positive dielectric anisotropy nematic film, there being no necessity for cooperating electrodes at the other surface of the nematic layer, and the display is therefore inexpensive to make and to assemble. The electrodes apply a primarily transverse electric field component with respect to the volume occupied by the very thin nematic film.

The applied electric field is used to distort the normal alignment of the long nematic molecules (alignment perpendicular to the major surfaces of the glass container plates) and thus to distort the nematic ordering of the material for controlling the birefringence properties of the film. The controlled birefringence is directly electric field sensitive and very low drive powers are therefore effective. This is in contrast to prior art turbulence displays which operate largely because of the presence of electrical currents and therefore consume substantially greater power. Since little electrical current flows, the liquid crystal materials find themselves in an environment in which they may have relatively long life.

Because an electric field effect is used, little power is consumed and positive dielectric anisotropy liquid crystals are readily employed which normally do not exhibit dynamic scattering effects, but are primarily electric field sensitive. The novel construction whereby the thickness of the active nematic film is maintained extremely small and very uniform permits efficient operation of the display in its optimum condition. The mesa construction affords immunity to atmospheric pressure changes and to warping or other causes of distortion of the display package. The mesas also serve beneficially during manufacture of the device, so that the outer wall 37 need serve only as a hermetic seal and no longer plays a major role in providing proper spacing of the plates 10 and 11. Further, the novel structure of the plate having the integrated mesa structure not only permits use of an extremely thin layer of liquid crystal material, but permits construction of the diffusing mirror directly on the outer surface of the mesa-bearing plate. Consequently, the diffusing mirror flakes or platelets may be located very close to the active liquid crystal layer, preferably between 2 and 5 mils from the active liquid crystal material. A consequence of the construction is that the thickness of the active layer is fixed and the position of the diffuse reflecting mirror is accurately spaced very close to the active layer, largely eliminating undesirable parallax and multiple image effects and affording a wide field of view.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Electro-optical display apparatus comprising:
   first and second coplanar optically transparent electrode means for forming an electric field between the coplanar electrodes;
   first optically transparent plate means having first inner surface means,
   said first and second coplanar optically transparent electrode means supported on said first transparent plate in spaced substantially parallel cooperative relation,
   optical circular polarization means spaced in substantially parallel relation with respect to the external surface means of said first optically transparent plate means,
   second optically transparent plate means having second inner surface means,
   mesa spacer means formed integrally with said second inner surface means for spacing said first inner surface means therefrom at a substantially constant predetermined distance,
   electric field sensitive optically active means disposed between said first and second surface means for controlling the degree of optical transmission of said electro-optical display apparatus in accordance with the value of said electric field,
   wall means for completing the enclosure of said electric field sensitive means sealed in hermetic relation at the peripheries of said first and second optically transparent plate means,
   diffuse reflector means permanently affixed to the external surface of said second optically transparent plate means, and
   said second optically transparent plate means bearing said diffuse reflector means being substantially thinner than the first of said optically transparent plate means so that said reflector means is relatively close to said coplanar electrode means for the purpose of substantially reducing parallax over a wide field of view.

2. Apparatus as described in claim 1 wherein said electric field sensitive means comprises a liquid crystal material demonstrating positive dielectric anisotropy.

3. Apparatus as described in claim 2 wherein the thickness of said liquid crystal material between said first and second surface means lies substantially between 0.5 and 2.5 microns.

4. Apparatus as described in claim 1 wherein said second optically transparent plate means bearing said diffuse reflector means has a thickness ranging from substantially 2 mils to substantially 5 mils.

* * * * *